United States Patent
Li et al.

(10) Patent No.: US 9,013,406 B2
(45) Date of Patent: Apr. 21, 2015

(54) MOUSE KEY IDENTIFICATION CIRCUIT, MOUSE KEY IDENTIFICATION DEVICE AND MOUSE

(75) Inventors: Zhiqian Li, Beijing (CN); Lun Lv, Beijing (CN); Yongqing Yan, Beijing (CN)

(73) Assignee: Beijing Sigmachip Co. Lt, Beijing (CN)

(*) Notice: Subject to any disclaimer, the term of this patent is extended or adjusted under 35 U.S.C. 154(b) by 303 days.

(21) Appl. No.: 13/602,269

(22) Filed: Sep. 3, 2012

(65) Prior Publication Data

US 2013/0057474 A1 Mar. 7, 2013

(30) Foreign Application Priority Data

Sep. 2, 2011 (CN) .......................... 2011 1 0258977

(51) Int. Cl.
*G06F 3/033* (2013.01)
*G06F 3/0354* (2013.01)
*G06F 3/038* (2013.01)

(52) U.S. Cl.
CPC ............ *G06F 3/03543* (2013.01); *G06F 3/038* (2013.01)

(58) Field of Classification Search
CPC ..... G06F 3/033; G06F 3/03543; G06F 3/038; G06F 2203/038
USPC ............................................ 345/56, 156, 163
See application file for complete search history.

(56) References Cited

U.S. PATENT DOCUMENTS

| | | | | |
|---|---|---|---|---|
| 5,208,582 A * | 5/1993 | Hwang | .......................... | 345/163 |
| 5,541,623 A * | 7/1996 | Engstrom | ..................... | 345/165 |
| 5,872,999 A | 2/1999 | Koizumi et al. | | |
| 6,710,323 B2 * | 3/2004 | Wang | ........................ | 250/214 R |
| 7,633,486 B2 * | 12/2009 | Lai et al. | ........................ | 345/156 |
| 8,471,809 B2 * | 6/2013 | Seki et al. | ..................... | 345/156 |
| 2002/0035701 A1 * | 3/2002 | Casebolt et al. | .............. | 713/300 |
| 2003/0179183 A1 * | 9/2003 | Lee | ................. | 345/163 |
| 2004/0133716 A1 * | 7/2004 | Lee | ................. | 710/72 |
| 2004/0189592 A1 * | 9/2004 | Prabhakaran | ................. | 345/156 |
| 2010/0090951 A1 * | 4/2010 | Xiao | ............................ | 345/163 |
| 2010/0207746 A1 * | 8/2010 | Song et al. | ................. | 340/407.2 |
| 2011/0109551 A1 * | 5/2011 | Zhou | ............................ | 345/163 |

FOREIGN PATENT DOCUMENTS

| | | |
|---|---|---|
| CN | 2747628 Y | 12/2005 |
| TW | 200915138 A | 4/2009 |

* cited by examiner

*Primary Examiner* — Joe H Cheng
(74) *Attorney, Agent, or Firm* — Bright IP Law Offices

(57) ABSTRACT

The disclosure discloses a mouse key identification circuit, a mouse key identification device and a mouse. The mouse key identification circuit comprises: N keys, M collection ports, a Light-Emitting Diode (LED) driver circuit and a grounding terminal, wherein part or all of i keys in N keys are connected to the LED port of the LED driver circuit by one respective end, while the other end of the i keys is connected to i collection ports of the M collection ports respectively, wherein i is less than N and N is a natural number; the grounding terminal is connected to one respective end of N−i keys of the N keys, and the other end of the N−i keys is connected to N−i collection ports of the M collection ports respectively. With the disclosure, the number of signal collection ports can be reduced and the cost of a mouse can be lowered.

14 Claims, 5 Drawing Sheets

MOUSE KEY IDENTIFICATION CIRCUIT, MOUSE KEY IDENTIFICATION DEVICE AND MOUSE

CROSS-REFERENCE TO RELATED APPLICATION

This application claims priority to Chinese Patent Application No. 201110258977.X. filed on Sep. 2, 2011, which is hereby incorporated by reference in its entirety.

TECHNICAL FIELD OF THE INVENTION

The disclosure relates to the field of a computer apparatus, and more particularly to a mouse key identification circuit, a mouse key identification device and a mouse.

BACKGROUND OF THE INVENTION

FIG. 1 shows a structure diagram of a mouse key identification circuit according to a conventional art FIG. 2 shows a structure diagram of a Light-Emitting Diode (LED) driver circuit of the mouse key identification circuit shown in FIG. 1. FIG. 3 shows a driving waveform diagram of an LED port in the LED driver circuit shown in FIG. 2.

In a common implementation scheme of an optical mouse implemented by an existing technology, an application circuit of a key switch and the scroll wheel switch as shown in FIG. 1 generally includes: KL/KM/KR ports used for three keys, Z1/Z2 ports used for the scroll wheel, and an LED drive port for driving an LED light.

FIG. 3 shows a driving waveform of an LED port in the application circuit of the LED port shown in FIG. 2. In the driving waveform diagram of the LED port, when the LED port outputs a low level, an LED is driven to light. When the output of the LED port is a high resistance, the LED does not light. At this moment, since an external LED is connected to the power supply, the level of the LED port would become a high level. In FIG. 2, Rn represents a current-limiting resistor and D represents an LED.

For the key, the scroll wheel and the LED driver of the mouse implemented by the existing technology above, at least six signal collection ports (port 1, port 2, port 3, port 4, port 5 and an LED port) are needed to output to a processor. For a mouse processor circuit integrated with a photoelectric sensor, the cost of implementing an overall solution of the mouse is higher if there are more ports; Therefore, to reduce the number of the ports of the mouse processor circuit integrated with a photoelectric sensor is significant to reduce the cost of the mouse.

For the problem of big package and high cost of a mouse circuit existing in the mouse key identification circuit implemented by the relevant art due to the requirement of excessive signal collection ports, no effective solution has been proposed so far.

SUMMARY OF THE INVENTION

For the problem of big package and high cost of a mouse circuit existing in the mouse key identification circuit implemented by the relevant art due to the requirement of excessive signal collection ports, no effective solution has been proposed so far. Therefore, the main purpose of the disclosure is to provide a mouse key identification circuit, a mouse key identification device and a mouse, to solve the problem above.

In order to achieve the purpose above, according to one aspect of the disclosure, a mouse key identification circuit is provided, comprising: N keys; M collection ports; an LED driver circuit, wherein part or all of i keys in N keys are connected to the LED port of the LED driver circuit by one respective end, while the other end of the i keys is connected to i collection ports of the M collection ports respectively, wherein i is less than N and N is a natural number; and a grounding terminal, connected to one respective end of N−i keys of the N keys, and the other end of the N−i keys is connected to N−i collection ports of the M collection ports respectively.

Further, in the case of i is less than or equal to M, one respective end of the i keys is connected to the LED port, and the other end of the i keys is connected to i collection ports of the M collection ports respectively.

Further, in the case of i is less than M and (N−i) is equal to M, one respective end of (N−i) keys of the N keys is grounded, and the other end thereof is connected to the M collection ports respectively.

Further, in the case of i is equal to M and (N−i) is equal to M too, one respective end of i keys of the N keys is connected to the LED port, one respective end of (N−i) keys of the N keys is grounded, and the other end of the N keys is connected to the M collection ports respectively.

Further, in the case of i is equal to M and (N−i) is less than M, one respective end of i keys of the N keys is connected to the LED port, and the other end of the i keys is connected to the M collection ports respectively, meanwhile one respective end of (N−i) keys of the N keys is grounded, and the other end of the (N−i) keys is connected to (N−i) collection ports of the M collection ports respectively.

Further, in the case of i is equal to M and (N−i) is less than or equal to M, one respective end of (i−n) keys of the N keys is connected to the LED port, the other end of the (i−n) keys is connected to (i−n) collection ports of the M collection ports respectively, and one respective end of n keys of the N keys is connected to the power supply and the other end of the n keys is connected to n collection ports of the M collection ports respectively.

Further, in the case of i is greater than M, one respective end of M keys of the i keys is connected to the LED port, the other end of the M keys is connected to the M collection ports respectively, one end of (i−M) keys of the i keys is connected to the power supply, and the other end of the (i−M) keys is connected to any one of the M collection ports respectively.

In order to achieve the purpose above, according to another aspect of the disclosure, a mouse key identification device is provided, comprising: N keys; M collection ports; an LED driver circuit, wherein part or all of i keys in N keys are connected to the LED port of the LED driver circuit by one respective end, while the other end of the i keys is connected to i collection ports of the M collection ports respectively, wherein i is less than N and N is a natural number; a grounding terminal, connected to one respective end of N−i keys of the N keys, and the other end of the N−i keys is connected to N−i collection ports of the M collection ports respectively; and a processor, connected to the M collection ports, performing logic processing of the key scanning signals which are collected by the M collection ports to obtain keys function signals.

Further, the processor comprises: a receiving port, configured to receive the key scanning signals collected by the M collection ports; a query device, configured to query in a key function signal database and acquire the corresponding key function signals through the received key scanning signal, wherein the key function signal database includes one or more association relations between the key scanning signals and the key function signals; and an output port, configured to output the acquired key function signals.

In order to achieve the purpose above, according to another aspect of the disclosure, a mouse is provided, comprising any one of the mouse key identification circuit described above.

By applying N keys, M collection ports, an LED driver circuit and a grounding terminal, wherein part or all of i keys in N keys are connected to the LED port of the LED driver circuit by one respective end, while the other end of the i keys is connected to i collection ports of the M collection ports respectively, wherein i is less than N and N is a natural number; the grounding terminal is connected to one respective end of (N−i) keys of the N keys, and the other end of the (N−i) keys is connected to (N−i) collection ports of the M collection ports respectively, the disclosure solves the problem of big package and high cost of a mouse circuit existing in the mouse key identification circuit implemented by the relevant art due to the requirement of many signal collection ports, thereby achieving an effect of reducing the number of signal collection ports and lowering the cost of a mouse.

BRIEF DESCRIPTION OF THE DRAWINGS

For a better understanding of the disclosure, accompanying drawings described hereinafter are provided to constitute one part of the application: the schematic embodiments of the disclosure and the description thereof are used to illustrate the disclosure but to limit the disclosure improperly. In the accompanying drawings.

DETAILED DESCRIPTION OF THE EMBODIMENTS

It should be noted that the embodiments in the application and the characteristics of the embodiments can be combined if no conflict is caused. The disclosure is described below in detail by reference to the accompanying drawings in conjunction with embodiments.

Figure 1:
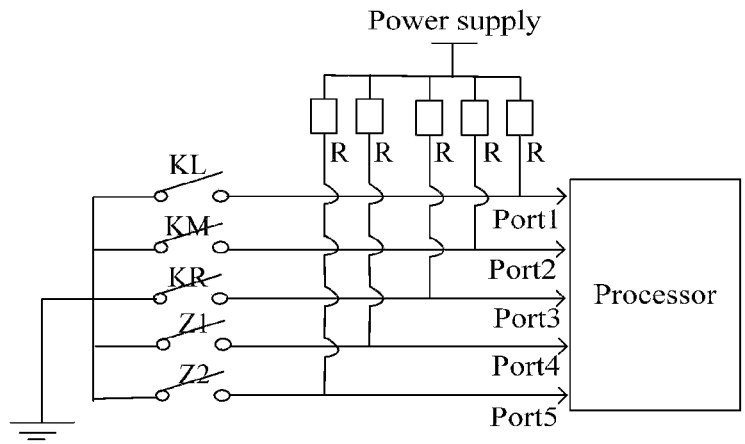
FIG. 1 shows a structure diagram of a mouse key identification circuit according to a relevant art.
Figure 2:
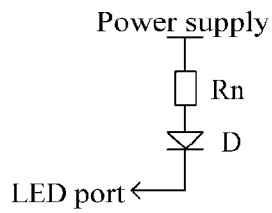
FIG. 2 shows a structure diagram of an LED driver circuit of the mouse key identification circuit shown in FIG. 1.
Figure 3:
FIG. 3 shows a driving waveform diagram of an LED port in the LED driver circuit shown in FIG. 2.
Figure 4:
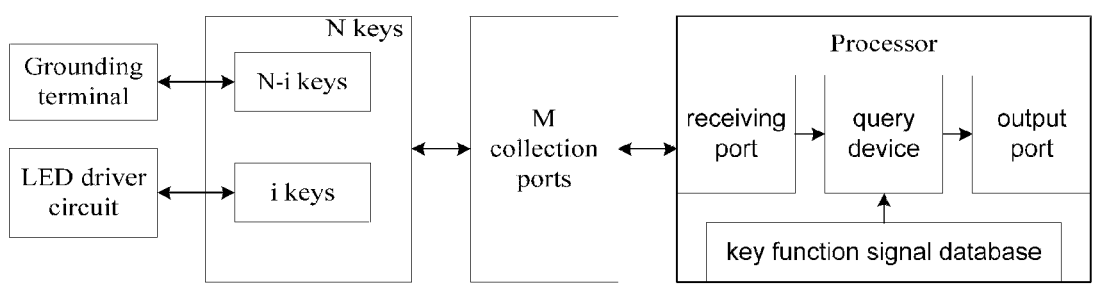
FIG. 4 shows a structure diagram of a mouse key identification circuit according to Embodiment 1 of the disclosure.
Figure 5:
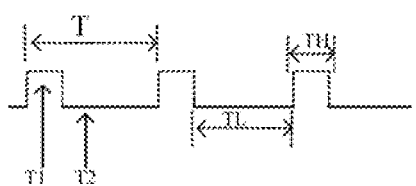
FIG. 5 shows a waveform diagram of an LED port in the LED driver circuit according to Embodiment 1 shown in FIG. 4.

FIG. 4 shows a structure diagram of a mouse key identification circuit according to Embodiment 1 of the disclosure; FIG. 5 shows a waveform diagram of an LED port in the LED driver circuit according to Embodiment 1 shown in FIG. 4;

As shown in FIG. 4, the mouse key identification circuit comprises: N keys; M collection ports: an LED driver circuit, wherein part or all of i keys in N keys are connected to the LED port of the LED driver circuit by one respective end, while the other end of the i keys is connected to i collection ports of the M collection ports respectively, wherein i is less than N and N is a natural number: the grounding terminal is connected to one respective end of (N−i) keys of the N keys, and the other end of the (N−i) keys is connected to (N−i) collection ports of the M collection ports respectively.

The above embodiment of the application controls the obtaining of different logical combinations of signals after each key is pressed by using a drive signal output of the LED port in the LED driver circuit; therefore, the collection ports in the system can achieve multiplexing of the same port at different times, thus the number of collection ports is reduced. The embodiment above solves the problem of big package and high cost of a mouse circuit existing in the mouse key identification circuit implemented by the relevant art due to the requirement of many signal collection ports, thereby achieving an effect of reducing the number of signal collection ports and lowering the cost of a mouse.

As shown in FIG. 5, in the specific implementation process of each embodiment of the disclosure, different logic signals are acquired with a high/low level in a detection period T in an LED driving waveform provided by the LED driver circuit, for example, status data of port 1, port 2, port 3 and LED port is collected at T1 moment and T2 moment respectively, wherein the corresponding status data is P1T1/PIT2, P2T1/P2T2, P3T1/P3T2, LEDT1/LEDT2 respectively. The detection period T is about 330 microseconds (µs); the time of high level TH generally lasts for 10 to 320 µs and the time of low level TL generally lasts for 10 to 320 µs.

In the above Embodiment 1 of the disclosure, in the case of i is less than or equal to M, one respective end of i keys is connected to the LED port, and the other end of the i keys is connected to i collection ports of the M collection ports respectively.

Figure 6:
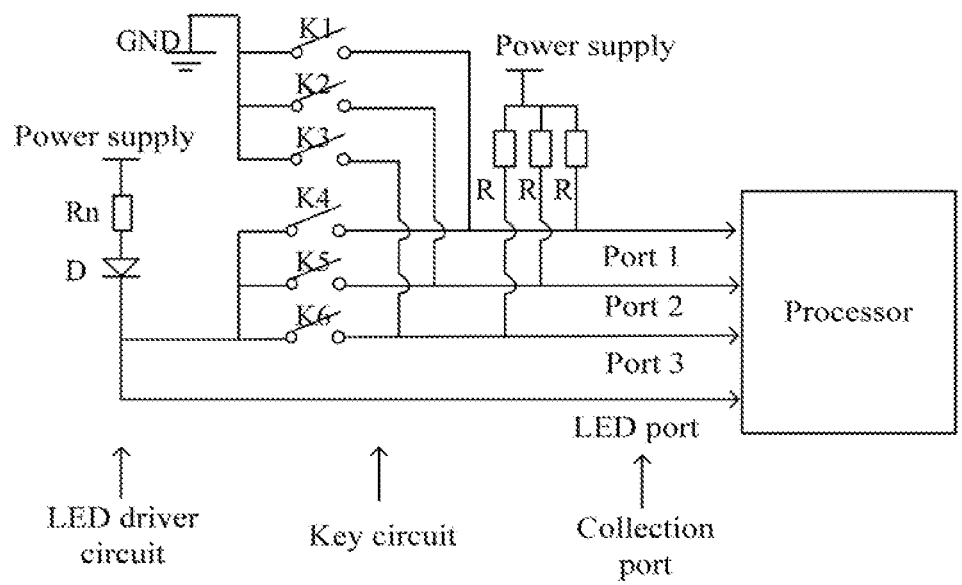
FIG. 6 shows a structure diagram of a mouse key identification circuit according to Embodiment 2 of the disclosure.

Preferably, in Embodiment 2 as shown in FIG. 6, in the case of i is equal to M and (N−i) is equal to M too, one respective end of i keys of the N keys is connected to the LED port, one respective end of (N−i) keys of the N keys is grounded, and the other end of the N keys is connected to the M collection ports respectively.

Based on the circuit above, the disclosure can list a plurality of implementation methods as follows:

1. when the left mouse key (for example, K1) is pressed, three ports and an LED port are collected at T1 moment, and the port value is 0, 1, 1 and 1 respectively; the port value collected at T2 moment is 0, 1, 1 and 0 respectively; after the process of a processor module, it can be identified that the left mouse key is pressed;

2, when the right mouse key (for example, K2) is pressed, three ports and an LED port are collected at T1 moment, and the port value is 1, 0, 1 and 1 respectively; the port value collected at T2 moment is 1, 0, 1 and 0 respectively; after the process of a processor module, it can be identified that the right mouse key is pressed;

3. when the left mouse key and one key of the scroll wheel (for example, K1 and K4) are pressed simultaneously, three ports and an LED port are collected at T1 moment, and the port value is 0, 1, 1 and 0 respectively; the port value collected at T2 moment is 0, 1, 1 and 0 respectively; after the process of a processor module, it can be identified that the left mouse key and one key of the scroll wheel are pressed simultaneously;

wherein when same key of K1, K2 and K3 and same key of K4, K5 and K6 are pressed simultaneously, a ground loop is formed, and the LED port still outputs a low level when the LED driving waveform has a high level.

The specific key combination is shown in the following table.

| Key combination | P1 port T1 | P1 port T2 | P2 port T1 | P2 port T2 | P3 port T1 | P3 port T2 | LED port T1 | LED port T2 |
|---|---|---|---|---|---|---|---|---|
| K1 | 0 | 0 | 1 | 1 | 1 | 1 | 1 | 0 |
| K2 | 1 | 1 | 0 | 0 | 1 | 1 | 1 | 0 |
| K3 | 1 | 1 | 1 | 1 | 0 | 0 | 1 | 0 |
| K4 | 1 | 0 | 1 | 1 | 1 | 1 | 1 | 0 |
| K5 | 1 | 1 | 1 | 0 | 1 | 1 | 1 | 0 |
| K6 | 1 | 1 | 1 | 1 | 1 | 0 | 1 | 0 |
| K1, K4 | 0 | 0 | 1 | 1 | 1 | 1 | 0 | 0 |
| K2, K5 | 1 | 1 | 0 | 0 | 1 | 1 | 0 | 0 |
| K3, K6 | 1 | 1 | 1 | 1 | 0 | 0 | 0 | 0 |
| K1K4K6 | 0 | 0 | 1 | 1 | 0 | 0 | 0 | 0 |
| K1K2K4 | 0 | 0 | 0 | 0 | 1 | 1 | 0 | 0 |
| K1K2K4/K6 | 0 | 0 | 0 | 0 | 0 | 0 | 0 | 0 |

Figure 7:
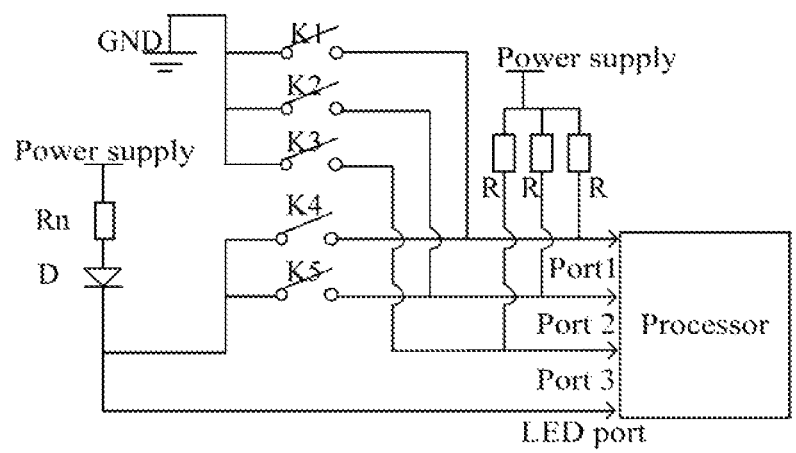
FIG. 7 shows a structure diagram of a mouse key identification circuit according to Embodiment 3 of the disclosure.

Preferably, in Embodiment 3 as shown in FIG. 7, in the case of i is less than M and (N−i) is equal to M, one respective end of (N−i) keys of the N keys is grounded, and the other end thereof is connected to the M collection ports respectively.

Specifically, as shown in FIG. 7, the logical combinations of collected data can be described below according to the case of 5 keys.

1. when the left mouse key (for example, K1) is pressed, three ports and an LED port are collected at T1 moment, and the port value is 0, 1, 1 and 1 respectively; the port value collected at T2 moment is 0, 1, 1 and 0 respectively; after the processing of a Digital Signal Processor (DSP) module, it can be identified as the left mouse key is pressed;

2. when the right mouse key (for example, K2) is pressed, three ports and an LED port are collected at T1 moment, and the port value is 1, 0, 1 and 1 respectively; the port value collected at T2 moment is 1, 0, 1 and 0 respectively; after the process of a processor module, it can be identified as the right mouse key is pressed;

3. when a page up key of the scroll wheel (for example, K4) is pressed, three ports and an LED port are collected at T1 moment, and the port value is 1, 1, 1 and 1 respectively; the port value collected at T2 moment is 0, 1, 1 and 0 respectively; after the process of a processor module, it can be identified as the page up key of the scroll wheel is pressed.

The specific key combination is shown in the following table.

| Key | P1 port T1 | P1 port T2 | P2 port T1 | P2 port T2 | P3 port T1 | P3 port T2 | LED port T1 | LED port T2 |
|---|---|---|---|---|---|---|---|---|
| K1 | 0 | 0 | 1 | 1 | 1 | 1 | 1 | 0 |
| K2 | 1 | 1 | 0 | 0 | 1 | 1 | 1 | 0 |
| K3 | 1 | 1 | 1 | 1 | 0 | 0 | 1 | 0 |
| K4 | 1 | 0 | 1 | 1 | 1 | 1 | 1 | 0 |
| K5 | 1 | 1 | 1 | 0 | 1 | 1 | 1 | 0 |

Figure 8:
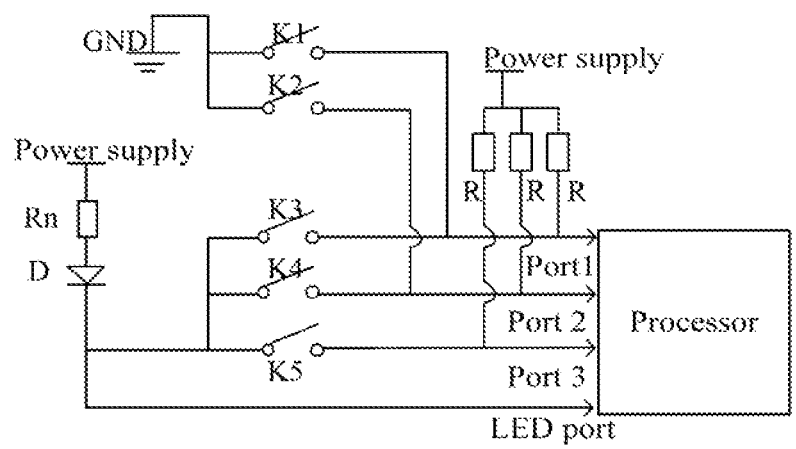
FIG. 8 shows a structure diagram of a mouse key identification circuit according to Embodiment 4 of the disclosure.

Preferably, in Embodiment 4 as shown in FIG. 8, in the case of i is equal to M and (N−i) is less than M, one respective end of i keys of the N keys is connected to the LED port, and the other end of the i keys is connected to the M collection ports respectively, meanwhile one respective end of (N−i) keys of the N keys is grounded, and the other end of the (N−i) keys is connected to (N−i) collection ports of the M collection ports respectively.

Specifically, as shown in FIG. 8, the logical combinations of collected data can be described below according to the case of 5 keys.

1. when the left mouse key (for example, K1) is pressed, three ports and an LED port are collected at T1 moment, and the port value is 0, 1, 1 and 1 respectively; the port value collected at T2 moment is 0, 1, 1 and 0 respectively: after the processing of the processor module, it can be identified as the left mouse key is pressed;

2. when the right mouse key (for example, K2) is pressed, three ports and an LED port are collected at T1 moment, and the port value is 1, 0, 1 and 1 respectively; the port value collected at T2 moment is 1, 0, 1 and 0 respectively; after the process of a processor module, it can be identified as the right mouse key is pressed;

3. when a page up key of the scroll wheel (for example, K4) is pressed, three ports and an LED port are collected at T1 moment, and the port value is 1, 1, 1 and 1 respectively; the port value collected at T2 moment is 1, 0, 1 and 0 respectively; after the processing of the processor module, it can be identified as the page up key of the scroll wheel is pressed.

The specific key combination is shown in the following table.

| Key | P1 port T1 | P1 port T2 | P2 port T1 | P2 port T2 | P3 port T1 | P3 port T2 | LED port T1 | LED port T2 |
|---|---|---|---|---|---|---|---|---|
| K1 | 0 | 0 | 1 | 1 | 1 | 1 | 1 | 0 |
| K2 | 1 | 1 | 0 | 0 | 1 | 1 | 1 | 0 |
| K3 | 1 | 0 | 1 | 1 | 1 | 1 | 1 | 0 |
| K4 | 1 | 1 | 1 | 0 | 1 | 1 | 1 | 0 |
| K5 | 1 | 1 | 1 | 1 | 1 | 0 | 1 | 0 |

Figure 9:
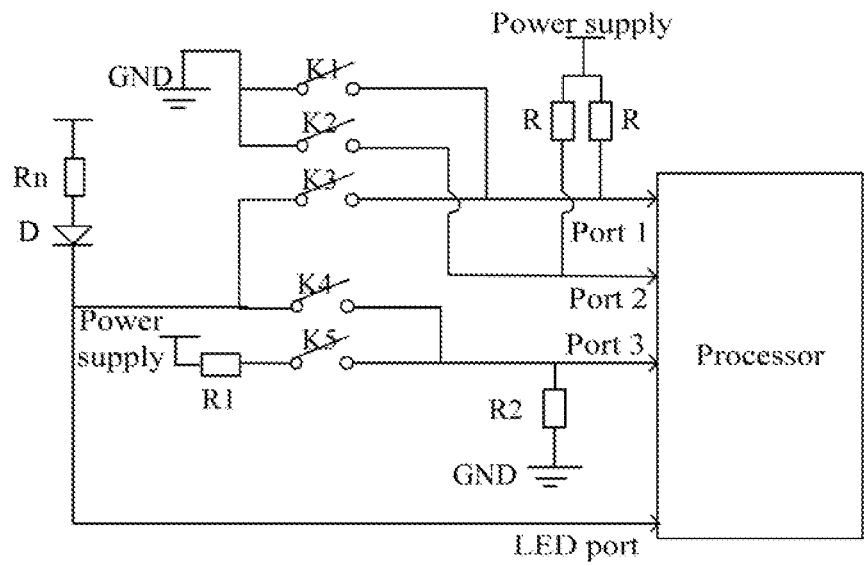
FIG. 9 shows a structure diagram of a mouse key identification circuit according to Embodiment 5 of the disclosure.

Preferably, in Embodiment 5 as shown in FIG. 9, in the case of i is equal to M and (N−i) is less than or equal to M, one respective end of (i−n) keys of the N keys is connected to the LED port; the other end of the (i−n) keys is connected to (i−n) collection ports of the M collection ports respectively; one respective end of n keys of the N keys is connected to the power supply, specifically, to the power supply through a resistor R1 respectively; the other end of the n keys is connected to the M collection ports respectively; meanwhile, the n keys also can be grounded through a resistor R2 respectively, wherein the resistance of the R2 is greater than that of the R1. The embodiment in FIG. 9 shows the condition of n being equal to 1.

Specifically, as shown in FIG. 9, this embodiment adds a group of ports and keys which are connected to a pull-down resistor or the power supply respectively; The logical combinations of collected data can be described below according to the case of 5 keys:

1. when the left mouse key (for example, K1) is pressed, three ports and an LED port are collected at T1 moment, and the port value is 0, 1, 0 and 1 respectively; the port value collected at T2 moment is 0, 1, 0 and 0 respectively; after the process of a processor module, it can be identified as the left mouse key is pressed;

2. when the right mouse key (for example, K2) is pressed, three ports and an LED port are collected at T1 moment, and the port value is 1, 0, 0 and 1 respectively; the port value collected at T2 moment is 1, 0, 0 and 0 respectively; after the process of a processor module, it can be identified as the right mouse key is pressed;

3. when a page up key of the scroll wheel (for example, K4) is pressed, three ports and an LED port are collected at T1 moment, and the port value is 1, 1, 1 and 1 respectively; the port value collected at T2 moment is 1, 1, 0 and 0 respectively; after the process of a processor module, it can be identified as the page up key of the scroll wheel is pressed.

4. when a page down key of the scroll wheel (for example, K5) is pressed, three ports and an LED port are collected at T1 moment, and the port value is 1, 1, 1 and 1 respectively; the port value collected at T2 moment is 1, 1, 1 and 0 respectively; after the process of a processor module, it can be identified as the page down key of the scroll wheel is pressed.

The specific key combinations are shown in the following table:

| Key | P1 port T1 | P1 port T2 | P2 port T1 | P2 port T2 | P3 port T1 | P3 port T2 | LED port T1 | LED port T2 |
|---|---|---|---|---|---|---|---|---|
| K1 | 0 | 0 | 1 | 1 | 0 | 0 | 1 | 0 |
| K2 | 1 | 1 | 0 | 0 | 0 | 0 | 1 | 0 |
| K3 | 1 | 0 | 1 | 1 | 0 | 0 | 1 | 0 |
| K4 | 1 | 1 | 1 | 1 | 1 | 0 | 1 | 0 |
| K5 | 1 | 1 | 1 | 1 | 1 | 1 | 1 | 0 |

Figure 10:
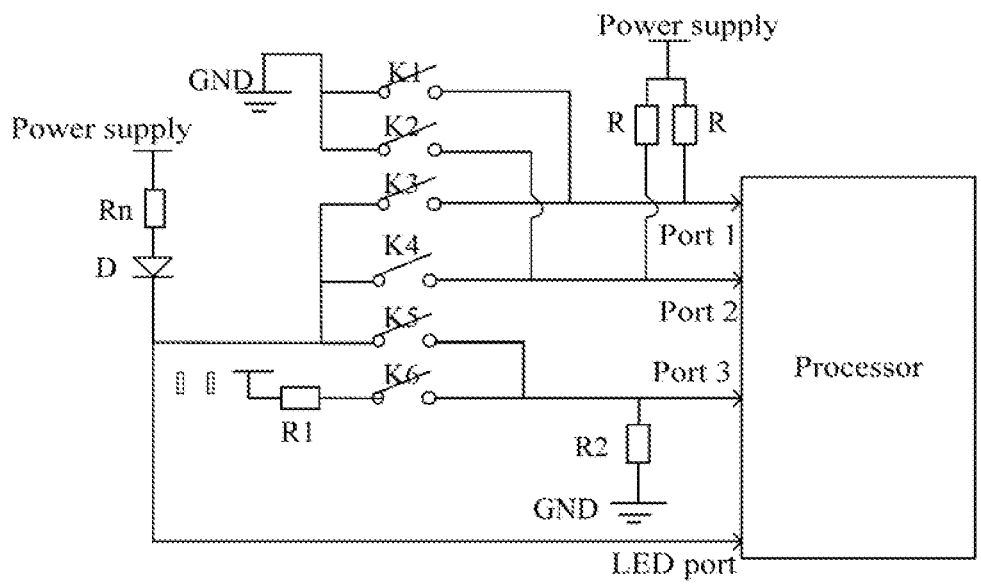
FIG. 10 shows a structure diagram of a mouse key identification circuit according to Embodiment 6 of the disclosure.

Preferably, in Embodiment 6 as shown in FIG. 10, in the case of i is greater man M, one respective end of M keys of the i keys is connected to the LED port; the other end of the M keys is connected to the M collection ports respectively; one end of (i−M) keys of the i keys is connected to the power supply, specifically, the (i−M) keys can be connected to the power supply through a resistor R1, and the other end of the (i−M) keys is connected to any one of the M collection ports respectively; meanwhile, the other end of the (i−M) keys also can be grounded through a resistor R2, wherein the resistance of the resistor R2 is greater than that of the resistor R1.

Specifically, as shown in FIG. 10, this embodiment adds a group of ports and keys which are connected to a pull-down resistor or the power supply respectively; the logical combinations of collected data can be described below according to the case of 6 keys:

1. when the left mouse key (for example, K1) is pressed, three ports and an LED port are collected at T1 moment, and the port value is 0, 1, 0 and 1 respectively; the port value collected at T2 moment is 0, 1, 0 and 0 respectively; after the processing of the processor module, it can be identified as the left mouse key is pressed;

2. when the right mouse key (for example, K2) is pressed, three ports and an LED port are collected at T1 moment, and the port value is 1, 0, 0 and 1 respectively; the port value collected at T2 moment is 1, 0, 0 and 0 respectively; after the process of a processor module, it can be identified as the right mouse key is pressed;

3. when a long press key of the scroll wheel (for example, K4) is pressed, three ports and an LED port are collected at T1 moment, and the port value is 1, 1, 0 and 1 respectively; the port value collected at T2 moment is 1, 0, 0 and 0 respectively; after the processing of the processor module, it can be identified as the long press key of the scroll wheel is pressed.

4. when a page up key of the scroll wheel (for example, K5) is pressed, three ports and an LED port are collected at T1 moment, and the port value is 1, 1, 1 and 1 respectively; the port value collected at T2 moment is 1, 1, 0 and 0 respectively; after the processing of the processor module, it can be identified as the page up key of the scroll wheel pressed.

5. when a page down key of the scroll wheel (for example, K6) is pressed, the port value scanned at T1 moment is 1, 1, 1 and 1, and the port value scanned at T2 moment is 1, 1, 1 and 0; wherein the resistance of the resistor R2 connected to the power supply is greater than that of the resistor R1 For example, the resistor R1 takes a value of 1 kΩ) and the resistor R2 takes a value of 10 kΩ.

The specific key combinations are shown in the following table.

| Key | P1 port T1 | P1 port T2 | P2 port T1 | P2 port T2 | P3 port T1 | P3 port T2 | LED port T1 | LED port T2 |
|---|---|---|---|---|---|---|---|---|
| K1 | 0 | 0 | 1 | 1 | 0 | 0 | 1 | 0 |
| K2 | 1 | 1 | 0 | 0 | 0 | 0 | 1 | 0 |
| K3 | 1 | 0 | 1 | 1 | 0 | 0 | 1 | 0 |
| K4 | 1 | 1 | 1 | 0 | 0 | 0 | 1 | 0 |
| K5 | 1 | 1 | 1 | 1 | 1 | 0 | 1 | 0 |
| K6 | 1 | 1 | 1 | 1 | 1 | 1 | 1 | 0 |

In the embodiments shown in FIG. 4 to FIG. 10, when one end of several keys are connected to different ports (for example, LED port, grounding terminal or power supply), the other end of the keys can be connected to the same collection port, also can be connected to different collection ports. However, when one respective end of several keys is connected to the same port (the port could be the LED port, grounding terminal or power supply), the other end of the keys must be connected to different collection ports.

Figure 11:
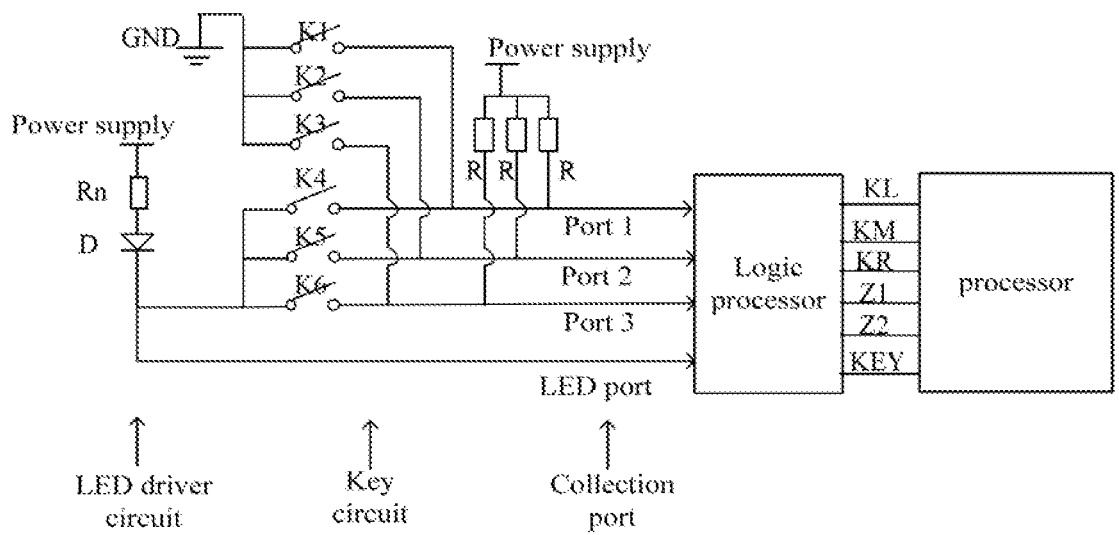
FIG. 11 shows a structure diagram of a mouse key identification circuit according to Embodiment 7 of the disclosure.

FIG. 11 shows a structure diagram of a mouse key identification circuit according to Embodiment 7 of the disclosure; as shown in FIG. 11, the mouse key identification device comprises: N keys; M collection ports; an LED driver circuit, wherein part or all of i keys in N keys are connected to the LED port of the LED driver circuit by one respective end, while the other end of the i keys is connected to i collection ports of the M collection ports respectively, wherein i is less than N and N is a natural number; a grounding terminal, which is connected to one respective end of (N−i) keys of the N keys, wherein the other end of the (N−i) keys is connected to (N−i) collection ports of the M collection ports respectively; and a processor, connected to the M collection ports, performing logic processing of the key scanning signals which are collected by the M collection ports to obtain keys function signals. In the application, a logic processor can be a single logic processor; also can be a microprocessor of a computer.

Preferably, when the processor in the embodiment above is a logic processor, the logic processor can be embedded in a microprocessor, wherein the processor comprises: a receiving port, configured to receive the key scanning signals collected by the M collection ports;

a query device, configured to query in a key function signal database and acquire the corresponding key function signals through the received key scanning signal, wherein the key function signal database includes one or more association relations between the key scanning signals and the key function signals; and an output port, configured to output the acquired key function signals.

Specific association mapping relations in the key function signal database are shown in the following table; however, there are many implementation methods, and the following table only shows the condition of single keys.

|     |    | Invention |    |    |          | Conventional art |    |    |    |    |     |
| --- | -- | --------- | -- | -- | -------- | ---------------- | -- | -- | -- | -- | --- |
| Key |    | P1 port | P2 port | P3 port | LED port | P1 port | P2 port | P3 port | P4 port | P5 port | LED port |
| K1  | T1 | 0 | 1 | 1 | 1 | 0 | 1 | 1 | 1 | 1 | — |
|     | T2 | 0 | 1 | 1 | 0 |   |   |   |   |   |   |
| K2  | T1 | 1 | 0 | 1 | 1 | 1 | 0 | 1 | 1 | 1 | — |
|     | T2 | 1 | 0 | 1 | 0 |   |   |   |   |   |   |
| K3  | T1 | 1 | 1 | 0 | 1 | 1 | 1 | 0 | 1 | 1 | — |
|     | T2 | 1 | 1 | 0 | 0 |   |   |   |   |   |   |
| K4  | T1 | 1 | 1 | 1 | 1 | 1 | 1 | 1 | 0 | 1 | — |
|     | T2 | 0 | 1 | 1 | 0 |   |   |   |   |   |   |
| K5  | T1 | 1 | 1 | 1 | 1 | 1 | 1 | 1 | 1 | 0 | — |
|     | T2 | 1 | 0 | 1 | 0 |   |   |   |   |   |   |
| K6  | T1 | 1 | 1 | 1 | 1 | — | — | — | — | — | — |
|     | T2 | 1 | 1 | 0 | 0 |   |   |   |   |   |   |

The embodiment above judges the state of each single key or a combination of keys of K1/K2/K3/K4/K5/K6 according to an acquired state by sending data to the microprocessor or mapping data to the logic processor.

The application also provides a mouse, which can includes any one implementation method of the mouse key identification circuit described above.

It can be seen from the description above that the disclosure achieves the following technical effects: the disclosure solves the problem of big package and high cost of a mouse circuit existing in the mouse key identification circuit implemented by the relevant art due to the requirement of many signal collection ports, thereby achieving an effect of reducing the number of signal collection ports and lowering the cost of a mouse.

The above is only the preferred embodiment of the disclosure and not intended to limit the disclosure. For those skilled in the art, various modifications and changes can be made to the disclosure. Any modification, equivalent substitute and improvement made within the spirit and principle of the disclosure are deemed to be included within the protection scope of the disclosure.

What is claimed is:

1. A mouse key identification circuit, comprising:
   N keys;
   M collection ports;
   an LED driver circuit, wherein part or all of i keys in N keys are connected to the LED port of the LED driver circuit by one respective end, while the other end of the i keys is connected to i collection ports of the M collection ports respectively, wherein i is less than N and N is a natural number; and
   a grounding terminal, connected to one respective end of N−i keys of the N keys, and the other end of the N−i keys is connected to N−i collection ports of the M collection ports respectively;
   wherein in the case of i is less than or equal to M, one respective end of the i keys is connected to the LED port, and the other end of the i keys is connected to i collection ports of the M collection ports respectively.

2. The circuit according to claim 1, wherein in the case of i is less than M and N−i is equal to M, one respective end of N−i keys of the N keys is grounded, and the other end thereof is connected to the M collection ports respectively.

3. The circuit according to claim 1, wherein in the case of i is equal to M and N−i is equal to M too, one respective end of i keys of the N keys is connected to the LED port, one respective end of N−i keys of the N keys is grounded, and the other end of the N keys is connected to the M collection ports respectively.

4. The circuit according to claim 1 wherein in the case of i is equal to M and N−i is less than M, one respective end of i keys of the N keys is connected to the LED port, and the other end of the i keys is connected to the M collection ports respectively, meanwhile one respective end of N−i keys of the N keys is grounded, and the other end of the N−i keys is connected to N−i collection ports of the M collection ports respectively.

5. The circuit according to claim 1, wherein in the case of i is equal to M and N−i is less than or equal to M, one respective end of i−n keys of the N keys is connected to the LED port, the other end of the i−n keys is connected to i−n collection ports of the M collection ports respectively, and one respective end of n keys of the N keys is connected to the power supply and the other end of the n keys is connected to n collection ports of the M collection ports respectively.

6. The circuit according to claim 1, wherein in the case of i is greater than M, one respective end of M keys of the i keys is connected to the LED port, the other end of the M keys is connected to the M collection ports respectively, one end of i−M keys of the i keys is connected to the power supply, and the other end of the i−M keys is connected to any one of the M collection ports respectively.

7. A mouse key identification device, comprising:
   N keys;
   M collection ports;
   an LED driver circuit, wherein part or all of i keys in N keys are connected to the LED port of the LED driver circuit by one respective end, while the other end of the i keys is connected to i collection ports of the M collection ports respectively, wherein i is less than N and N is a natural number;
   a grounding terminal, connected to one respective end of N−i keys of the N keys, and the other end of the N−i keys is connected to N−i collection ports of the M collection ports respectively; and
   a processor, connected to the M collection ports, performing logic processing of key scanning signals which are collected by the M collection ports to obtain keys' function signals;
   wherein in the case of i is less than or equal to M, one respective end of the i keys is connected to the LED port, and the other end of the i keys is connected to i collection ports of the M collection ports respectively.

8. The device according to claim 7, wherein the processor comprises:
   a receiving port, configured to receive the key scanning signals collected by the M collection ports;
   a query device, configured to query in a key function signal database and acquire corresponding key function signals through the key scanning signals received, wherein the key function signal database includes one or more association relations between the key scanning signals and the key function signals; and an output port, configured to output the acquired key function signals.

9. A mouse, comprising the mouse key identification circuit according to claim 1.

10. A mouse, comprising the mouse key identification circuit according to claim 2.

11. A mouse, comprising the mouse key identification circuit according to claim 3.

12. A mouse, comprising the mouse key identification circuit according to claim 4.

13. A mouse, comprising the mouse key identification circuit according to claim 5.

14. A mouse, comprising the mouse key identification circuit according to claim 6.

* * * * *